United States Patent
Wang et al.

(10) Patent No.: US 12,192,891 B2
(45) Date of Patent: Jan. 7, 2025

(54) DEVICES, SYSTEMS AND METHODS FOR THROUGHPUT ORIENTED ASSOCIATION WITH ACCESS POINT DEVICES

(71) Applicant: Cypress Semiconductor Corporation, San Jose, CA (US)

(72) Inventors: Xianmin Wang, Westfield, NJ (US); Hui Luo, Marlboro, NJ (US)

(73) Assignee: Cypress Semiconductor Corporation, San Jose, CA (US)

(*) Notice: Subject to any disclaimer, the term of this patent is extended or adjusted under 35 U.S.C. 154(b) by 558 days.

(21) Appl. No.: 17/486,715

(22) Filed: Sep. 27, 2021

(65) Prior Publication Data
US 2023/0098347 A1 Mar. 30, 2023

(51) Int. Cl.
*H04W 48/20* (2009.01)
*H04B 17/318* (2015.01)
*H04L 43/0894* (2022.01)
*H04W 24/08* (2009.01)
*H04W 48/10* (2009.01)

(52) U.S. Cl.
CPC .......... *H04W 48/20* (2013.01); *H04B 17/318* (2015.01); *H04L 43/0894* (2013.01); *H04W 24/08* (2013.01); *H04W 48/10* (2013.01)

(58) Field of Classification Search
None
See application file for complete search history.

(56) References Cited

U.S. PATENT DOCUMENTS

| | | | |
|---|---|---|---|
| 2006/0064497 A1* | 3/2006 | Bejerano | H04W 28/086 709/228 |
| 2006/0258286 A1* | 11/2006 | Qi | H04W 76/14 455/41.2 |
| 2008/0137577 A1* | 6/2008 | Habetha | H04W 52/24 370/337 |
| 2009/0190531 A1* | 7/2009 | Jetcheva | H04L 45/124 370/406 |
| 2011/0216692 A1* | 9/2011 | Lundsgaard | H04W 36/304 370/328 |
| 2012/0224481 A1* | 9/2012 | Babiarz | H04L 47/2408 370/230.1 |
| 2012/0224484 A1* | 9/2012 | Babiarz | H04L 41/5019 370/235 |
| 2015/0103812 A1* | 4/2015 | Zhao | H04W 48/16 370/338 |
| 2015/0223160 A1* | 8/2015 | Ho | H04W 92/12 370/338 |

(Continued)

FOREIGN PATENT DOCUMENTS

WO    WO-2015130200 A1 * 6/2015 .......... H04W 72/042

*Primary Examiner* — Joseph A Bednash

(57) ABSTRACT

A method can include, by operation of a station wireless device (STA): receiving a plurality of different broadcast transmissions, determining an air time availability of each of a plurality of access point devices (APs) from data included within the broadcasts, for each of the plurality of APs, estimating a data rate for the STA with respect to the AP from traffic data included in at least one broadcast transmission from the AP, selecting one AP from the plurality of APs based on predetermined traffic metrics for the plurality of APs, and associating with the selected AP. Corresponding devices and systems are also disclosed.

20 Claims, 11 Drawing Sheets

(56) References Cited

U.S. PATENT DOCUMENTS

2015/0312319 A1* 10/2015 Wentink ............... H04W 72/21
370/329
2015/0350974 A1* 12/2015 Patil ................. H04W 36/0085
370/331

* cited by examiner

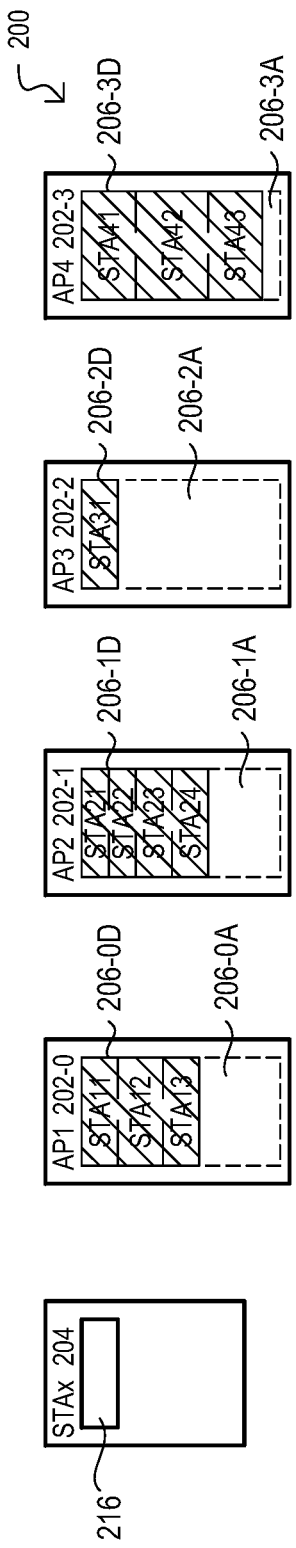
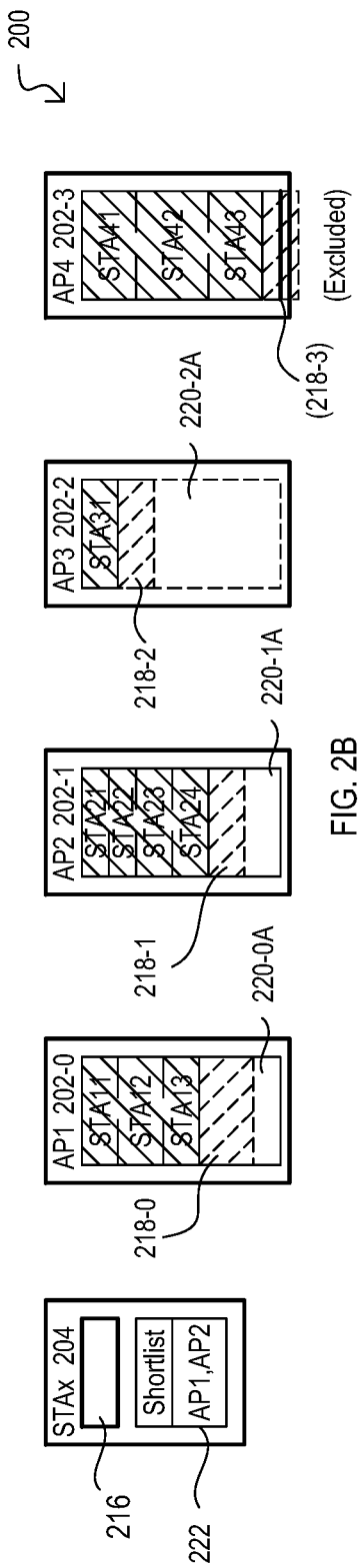
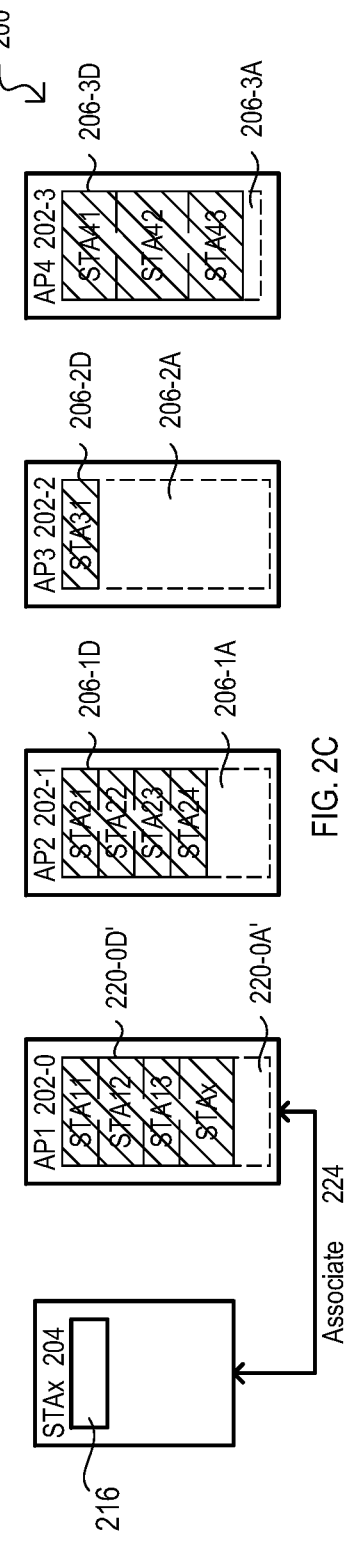

DEVICES, SYSTEMS AND METHODS FOR THROUGHPUT ORIENTED ASSOCIATION WITH ACCESS POINT DEVICES

TECHNICAL FIELD

The present disclosure relates generally to wireless networks, and more particularly to association processes for station devices (STAs) operating in environments with multiple networks (e.g., BSSs).

BACKGROUND

Conventional WiFi systems can include basic service sets (BSSs) composed of an access point device (AP) and one or more station devices (STAs). When a new STA enters a wireless network operating environment, it can associate with an AP to join the corresponding BSS. Efficient AP association in dense deployment environments, such as stadiums, airports, or large business buildings, continues to be an ongoing problem. In these environments, WiFi hotspots (e.g., BSSs) are typically deployed with such density that tens or even hundreds of APs are operating closely to each other in a given area providing data service for a large number of STAs. Due to existing association rules, a resulting service is often distributed non-uniformly over space.

Conventionally, STAs use a "strongest signal first (SSF)" association scheme as indicated in IEEE 802.11 wireless standards. When using SSF for AP selection, a newly arrived STA scans nearby APs and will attempt to associate with the AP having the strongest signal, as determined from a receive signal strength indication (RSSI).

A drawback to conventional AP joining methods can be channel congestion. In dense deployment environments with large number of unevenly distributed STAs, it is likely that some APs experience channel congestion due to a large number of associated STAs, while other APs are lightly loaded. Such an unbalanced load among the multiple APs leads to inefficient channel resource utilization and overall network performance degradation.

It would be of great benefit to arrive at some way of increasing the efficiency of wireless systems in densely deployed environments.

BRIEF DESCRIPTION OF THE DRAWINGS

FIG. 2A to 2C are diagrams showing wireless operations according to other embodiments.

DETAILED DESCRIPTION

Embodiments can include a distributed, high-efficiency approach to associating wireless devices (i.e., STAs) with network controller devices (i.e., APs) in dense operating environments. According to embodiments, APs can broadcast received power value (e.g., RSSI), air time, and data rates of associated STAs information. A newly arrived STA can scan for such broadcasts, measure received power, and generate estimated data rates and thus the needed air time that would result were the STA to associate with an AP, for every AP. The STA can then select an AP for association according to such estimates.

In some embodiments, a STA can establish a subset of AP candidates for association by selecting those APs with the least remaining air time that can satisfy the STA's throughput requirement. A STA can then select one AP from the subset for association. In some embodiments, such a selection can be random.

In some embodiments, a STA can exclude an AP from consideration if a received power value (e.g., RSSI) of a broadcast from the AP is below a predetermined threshold.

In some embodiments, a STA can exclude an AP from consideration if, by associating with the AP, the traffic load of the AP exceeds a predetermined threshold.

In some embodiments, if an AP does not have sufficient air time left (i.e., the AP's traffic load is full or near full), a STA can generate an estimated data rate for itself, based on a received power value from broadcasts by an AP, in referencing the power values of all associated STAs in the broadcasts, multiplying a factor less than one, which is estimated by squeezing all associated STA's air time to make room for the air time needed by the newly arrived STA (all associated STAs will proportionally slow down as the newly arrived STA associates with the AP due to competing air time).

In some embodiments, APs can operate with air time fairness, allocating the amount of air time equal to, or proportionally less than, the air time needed to achieve the expected throughput for each associated STA. If a STA needs much bigger throughput than indicated when the STA associates with the AP, the AP can put a limit on its expected throughput.

Figure 1A:
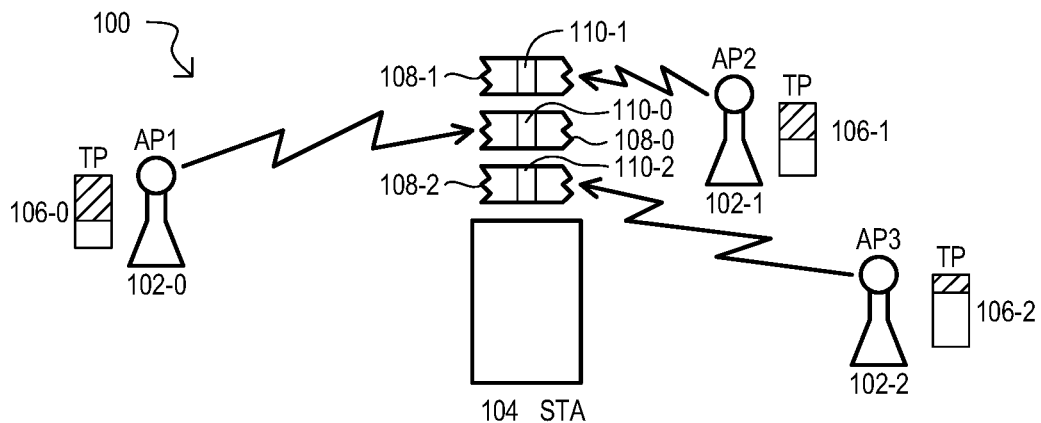
FIGS. 1A to 1C are diagrams showing wireless operations according to embodiments.
Figure 1B:
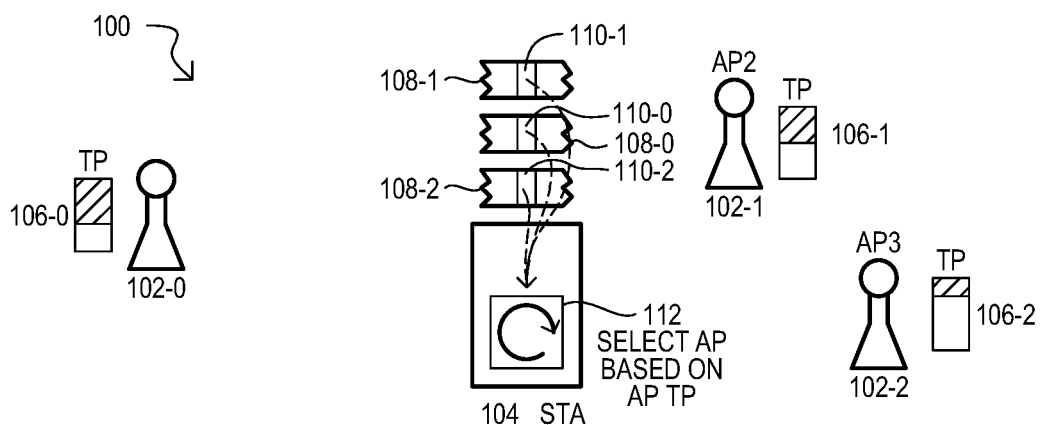
Figure 1C:
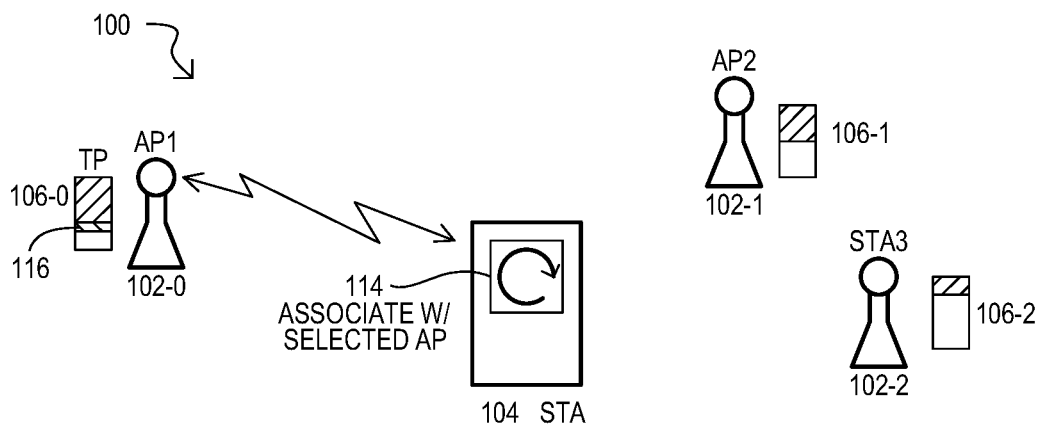

FIGS. 1A to 1C are diagrams showing operations in a wireless environment according to an embodiment. A wireless environment 100 can include multiple APs 102- to 102-2 and a newly arrived STA 104. Newly arrived STA 104 can seek association with one of APs 102-0 to -2.

Referring to FIG. 1A, each of APs 102-0 to -2 can issue broadcast transmissions 108-0 to -2. Broadcast transmissions (108-0 to -2) can be detected by any compatible STA in range of the originating AP. In some embodiments, broadcast transmissions (108-0 to -2) can be periodic beacons transmitted by APs (102-0 to -2). In some embodiments, broadcast transmissions (108-0 to -2) can be beacon frames compatible with one or more IEEE 802.11 wireless standards. Broadcast transmissions (108-0 to -2) can each include communication information 110-0 to -2 corresponding to the APs (102-0 to -2). Communication information (110-0 to -2) can take any suitable form that can enable a newly arrived STA 104 to estimate its own data rate with respect to each AP (102-0 to -2), as well as available air time for each AP (102-0 to -2). In some embodiments, communication information can include any of: receive power for each associated STA, a modulation scheme and/or coding rate for each associated STA, and/or air time for each associated STA at its AP.

Referring to FIG. 1B, a newly arrived STA 104 can extract the communication information (110-0 to -2) from broadcast transmissions (108-0 to -2). STA 104 can execute a selection process 112 to select one of the APs (102-0 to -2) for association based on communication information (110-0 to -2). In some embodiments, a selection process can include selecting from one or more APs having a lowest available air time, however, alternate embodiments can include processes based on other AP traffic metrics.

Referring to FIG. 1C, after selecting an AP, a STA 104 can execute an association process 114 with the selected AP. In the embodiment shown, STA 104 selects AP1, which is one of the APs having a lowest available throughput 106-0. Once newly arrived STA 104 is associated with AP1 102-0, AP1 its available air time 106-0 will grow smaller, as a new portion of throughput 116 is dedicated to STA 104.

FIGS. 2A to 2C are diagram showing operations for a wireless environment according to additional embodiments. In some embodiments, the operations of FIGS. 2A to 2C can be versions of those shown in FIGS. 1A to 1C. A wireless environment 200 can include APs 202-0 to -3, a joining STA 204, and various other STAs (not shown). A total air time of APs (202-0 to -3) is represented by a rectangle, and includes dedicated air time (206-0D to 206-3D) and available air time (206-0A to 206-3A).

FIGS. 2A to 2C show an arrangement in which APs can operate with air time fairness. With air time fairness, an AP can allocate air time based on a STAs expected throughput. Thus, AP1 202-0 is shown associated with STA11, STA12 and STA13 (not shown), and allocates air time sufficient to enable equal throughput among the STAs. Similarly, AP2 202-1 allocates equal throughput to STA21, STA22, STA23, STA24 (not shown). AP3 202-2 is associated with only one station device, STA31 (not shown). AP4 202-3 is associated with STA41, STA42, STA43 (not shown).

In some embodiments, newly joining STAx 204 can have its own throughput value 216.

FIG. 2A shows a status of the various devices before STAx 204 has selected an AP for association. STAx 204 can detect wireless broadcasts messages from each AP (202-0 to -3) which can include information for STAs associated with that AP. AP information can take any suitable form, as described herein or equivalents. From such information, STAx 204 can estimate its air time for each AP (202-0 to -3) based on its throughput value 216 and determine the available throughput (206-0A to -3A) for all APs (202-0 to -3).

FIG. 2B shows operations following STAx 204 receiving broadcast transmissions. STAx 204 can generate estimated air time values and select AP candidates for association. STAx 204 can estimate its effect were it to associate with each AP (202-0 to -2). Such operations are represented in FIG. 2B by estimated STA air time values 218-0 to 218-3 added to the dedicated air time for each AP (202-0 to -3).

Referring still to FIG. 2B, a STA can select AP candidates for association according to throughput metrics for the APs. In some embodiments, selection can be based, at least in part, on lowest available air time. It is understood that if the addition of the air time of a STA would exceed the available air time of an AP, the AP can be excluded as a candidate for association. This is represented by AP4 202-3 in FIG. 2B. Because the association of STAx with AP2 202-3 is estimated to exceed the available air time of AP4 202-3, STAx can exclude the AP2 202-3 from consideration for association. In the embodiment shown, AP1 202-0 and AP2 202-1 have a lowest estimated available air time 220-0A/220-1A, and so are considered candidates for association (shown by short list 222). AP3 202-2 can be excluded from consideration as its estimated available air time can be determined to be too large. Exclusion of a high available throughput/air time AP, like AP3 202-2, can advantageously reserve the AP for other (possibly high throughput) STAs that may arrive in the future.

Selection of AP candidates based on lowest estimated available air time (or greatest estimated aggregate air time) can take any suitable form. In some embodiments, a STA can select some minimum number of APs for consideration (e.g., two). However, alternate embodiments can include other considerations, including but not limited to: a relative difference between estimated air time values (i.e., if there are three AP candidates, but one has an available air time substantially greater than the others, the larger available air time AP is excluded); number of STAs already associated with the AP (an AP with fewer associated STAs may be preferred for association over those with more associated STAs). In some embodiments, selection of one AP from multiple candidates can be a random or pseudorandom selection to prevent multiple STAs executing a same association method from attempting to associate with the same AP.

FIG. 2C shows STAx selecting and associating 224 with AP1 202-0. With the association of STAx, AP1 202-0 can have a revised, smaller, available air time 206-0A' (and larger aggregate dedicated air time 202-0D').

Figure 3:
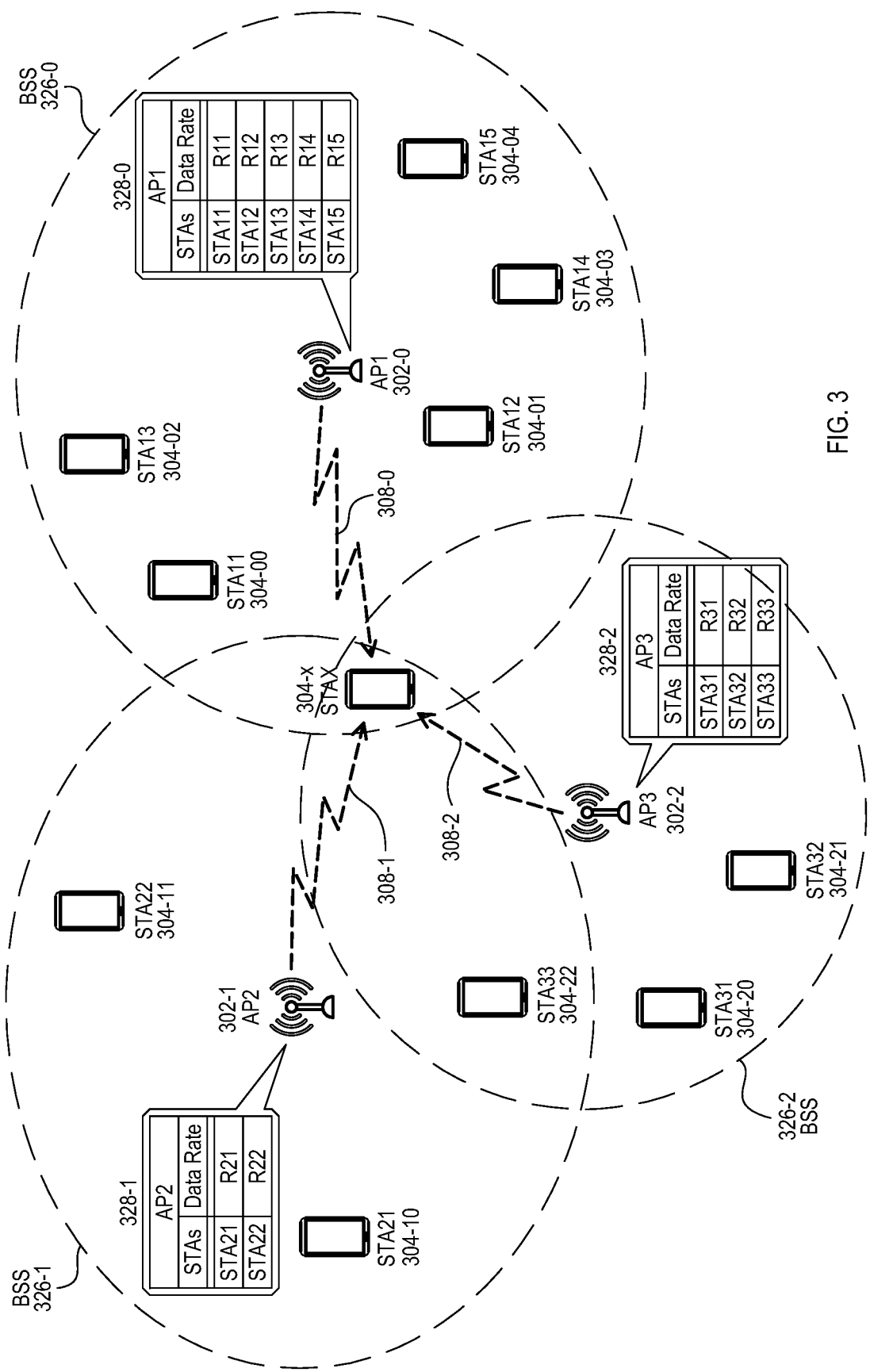
FIG. 3 is a diagram showing wireless operations according to additional embodiments.

FIG. 3 is a diagram showing operations in a wireless environment 300 according to another embodiment. Wireless environment 300 can include a number of basic service sets (BSSs) 326-0 to -2 that can each be compatible with an IEEE 802.11 wireless standard. Each BSS (326-0 to -2) can include an AP associated with a set of STAs. BSS 326-0 includes AP1 302-0 associated with STA11 to STA15 (304-00 to -04). BSS 326-1 includes AP2 302-1 associated with STA21 and STA22 (304-10/11). BSS 326-2 includes AP3 302-2 associated with STA31 to STA33 (304-20 to -22). BSSs (326-0 to -2) can have overlapping operating ranges. Each of APs (302-0 to -2) can maintain traffic information 328-0 to -2 that results from associated STAs. In some embodiments, traffic information (328-0 to -2) can include a data rate for each associated STA. In some embodiments, some or all of APs (302-0 to -2) can operate with air time fairness. However, in alternate embodiments APs (302-0 to -2) may not use air time fairness.

Referring still to FIG. 3, STAx 304-x can be an unassociated STA in the operating environment, in range of all BSSs (326-0 to -2). STAx 304-x can receive beacon transmissions 308-0 to -2 from APs (302-0 to -2). Beacon transmissions (308-0 to -2) can include information for STAs associated with APs (302-0 to -2), which can take the form of any of those described herein, including but not limited to: any or all of data rate information (328-0 to -2); available air time; modulation scheme; or symbol rate.

Figure 4:
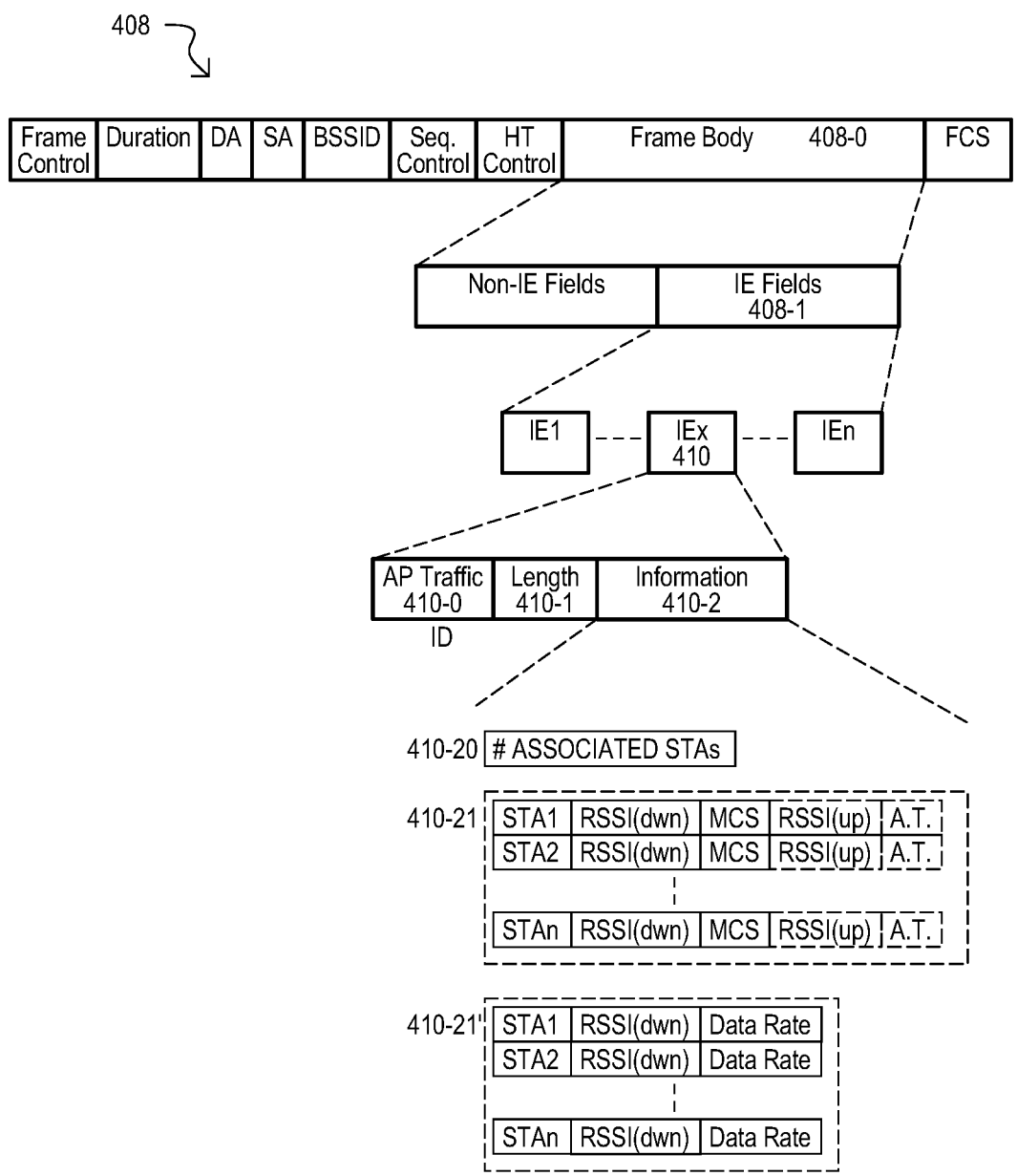
FIG. 4 is a diagram of an AP broadcast transmission according to an embodiment.

According to embodiments, an unassociated STA can receive a broadcast transmission from APs that include traffic information for the APs. From such traffic information, a newly arrives STA can estimate its own data rate and effect on AP air time were the STA to associate with the AP. Such broadcast transmissions can take any suitable form according to the wireless protocol. FIG. 4 shows a broadcast transmission according to one embodiment, and should not be construed as limiting.

FIG. 4 is a diagram of a broadcast transmission 408 according to an embodiment. A broadcast transmission 408 can include a beacon frame compatible with one or more IEEE 802.11 wireless standards. A broadcast transmission 408 can have various fields, including a frame control, duration, destination address, source address, basic service set ID, sequence control, high throughput control, a frame body 408-0, and frame check sequence. A frame body 408-0 can include non-information element (IE) fields and IE fields 408-1. IE fields 408-1 can include a number of IEs, including an AP Traffic IE 410. An AP Traffic IE 410 can include an IE ID field 410-0, a length field 410-1 and an information field 410-2. An IE ID field 410-0 can identify the IE as including AP traffic information (e.g., for use by a newly arrived ST). A length value 410-1 can indicate a size of the IE. IE information 410-2 can include traffic (or communication) information according to any of the embodiments described herein and equivalents.

In some embodiments, IE information 410-2 can include, but is not limited to, the number of STAs associated with the AP 410-20 and data for each STA associated with the AP 410-21. In the embodiment shown, data for each associated STA 410-12 can include: a downlink power value (RSSI (dwn)) (i.e., the power value at the STA of transmissions from AP) and a modulation and/or coding scheme for the STA (MCS). Optionally, IE information can also include an uplink power value (RSSI(up)) and/or an air time value (A.T.). An air time value (A.T.) can include air time used by a STA (e.g., running average of up/down time) and/or available air time for the AP. From such traffic information, newly arrived STA can estimate its own data rate for the AP.

As noted herein, traffic information can take various forms. FIG. 4 shows associated STA information 410-21' provided in a beacon for an alternate embodiment. STA information 410-21' can include RSSI(dwn) as well as a data rate for the associated STA (Data Rate). A Data Rate for the associated STA can be a data rate estimated by the AP or by the associated STA based on modulation/coding and power values. Alternatively, a Data Rate for the associated STA can be an actual data rate determined by the associated STA for the AP over a given time period. A Data Rate for the associated STA can be for downlink data (from AP to STA), uplink data (from STA to AP), or combinations thereof. In some embodiments, such Data Rate values can be averages over time.

While the devices and operations disclosed show various methods according to embodiments, additional methods will now be described with reference to a number of flow diagrams.

Figure 5:
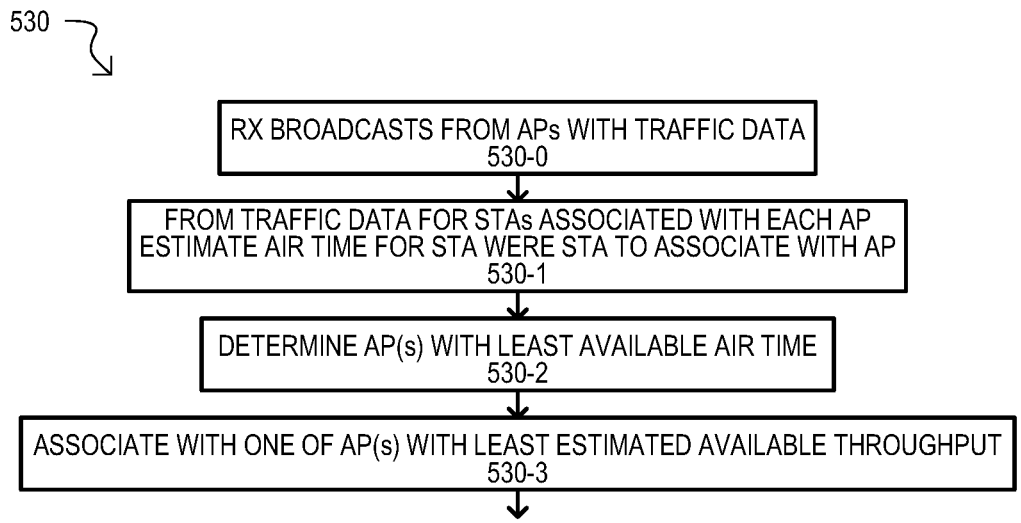
FIG. 5 is a flow diagram of a method for STA association according to an embodiment.

FIG. 5 is a flow diagram of a method 530 according to an embodiment. A method 530 can be executed by a STA device when deciding to associate with an AP when in the range of multiple APs. A method 530 can include receiving broadcasts from APs that include traffic data 530-0. Such an action can include receiving broadcast transmissions from multiple APs, where such broadcast transmissions can include traffic information for the AP as described herein, or equivalents. From the traffic data for the STAs associated with an AP, a STA can estimate its air time were the STA to associate with the AP 530-1. In some embodiments, such an action can include using a received power value for the broadcast for each AP.

A method 530 can further include determining APs with lowest available estimated available air time 530-2. Such an action can include using traffic information from each AP. In some embodiments, each AP can provide an available air time value that it has generated based on traffic over a predetermined time period. However, in other embodiments, an AP can derive an available air time for an AP by aggregating estimated air times for the STAs associated with the AP, and subtracting such a value from a maximum air time. In some embodiments, a set can include multiple APs. However, in other embodiments, a set can include but one AP. A STA can then associate with one of the APs with least estimated available air time 530-3. In some embodiments, such an action can include randomly selecting one AP from a set of multiple APs.

Figure 6:
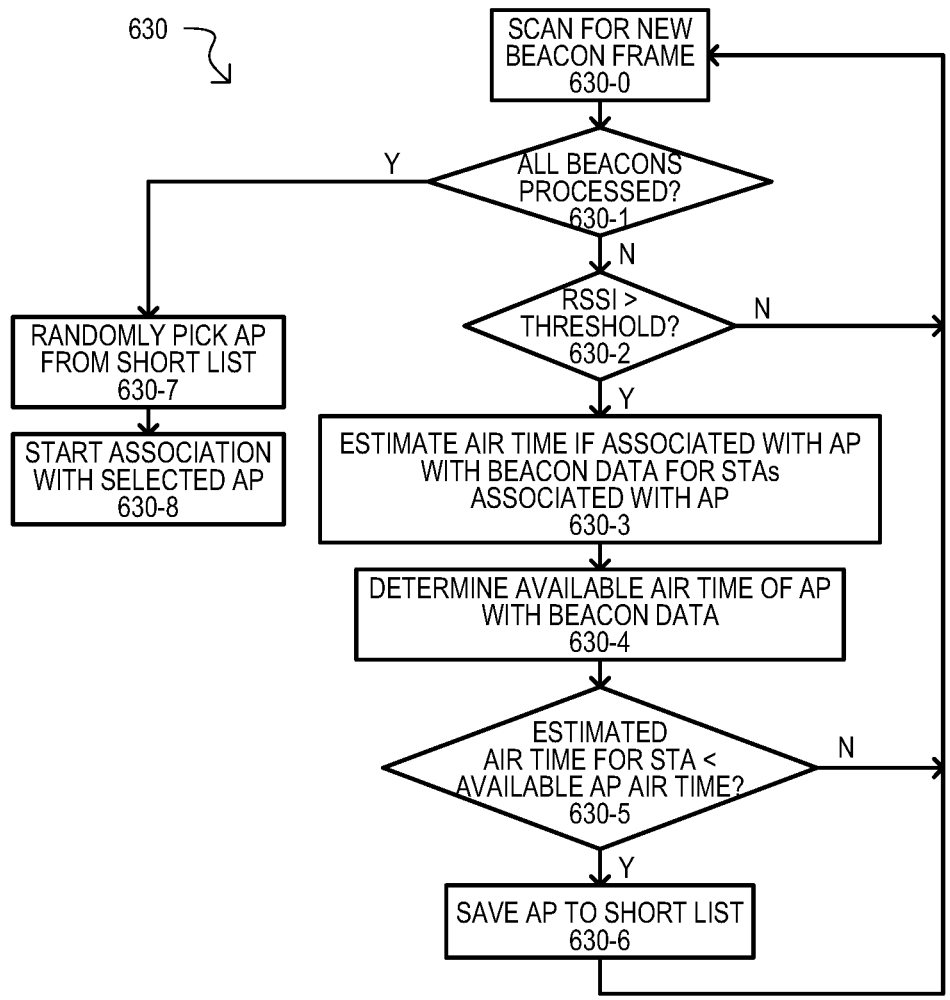
FIG. 6 is a flow diagram of a method for STA association according to another embodiment.

FIG. 6 is a flow diagram of a method 630 according to another embodiment. A method 630 can be executed by a STA seeking association with an AP in a dense operating environment. In some embodiments, a method 630 can be compatible with communications according to one or more IEEE 802.11 wireless standards. A method 630 can include scanning for new beacon frames 630-0. In some embodiments, such an action can include a STA monitoring one or more wireless channels.

A method 630 can continue to monitor channel(s) until all beacons have been processed 630-1. In some embodiments, such an action can include a STA monitoring one or more wireless channels over one or more beacon intervals as indicated by a protocol in use. A beacon interval can be predetermined time period over which a beacon is repeated. In addition or alternatively, such an action can also include monitoring until a STA begins to receive beacons from the same APs.

While all beacons have not been processed 630-1 (N from 630-1), a method 630 can determine whether a receive power of a beacon is above a predetermined threshold 630-2. In some embodiments, this can include determining if a received signal strength indicator (RSSI) is above a predetermined value. If a receive power of a beacon is not above a threshold (N from 630-2), a method 630 can continue scanning for new beacons 630-0.

If a receive power of a beacon is above a threshold (Y from 630-2), a method 630 can estimate air time if associated with the AP using beacon data for STAs associated with the AP 630-3. In some embodiments, an action can include using power values and modulation/coding schemes for associated STAs, and finding a closest matching STA, or estimating from values of one or more STAs. A method 630 can determine available air time for the AP from beacon data 630-4. Such an action can include, but is not limited to, estimating available air time by aggregating air time for associated STAs or from an air time value provided by an AP.

If a STA estimated air time is not less than an available air time for the AP (N from 630-5), a method 630 can return to scanning for beacons. As will be shown herein, in some embodiments, if all APs do not have sufficient available air time to accommodate a STAs throughput needs, the STA can scale down its estimated air time. If a STA estimated air time is less than an available air time for the AP (Y from 630-5), the STA can be saved to a "short list" 630-6. A short list can be a list of candidate APs for association. In some embodiments, a short list can be limited to those APs having the least available air time.

When all beacons have been processed (Y from 630-1), a method 630 can randomly select one AP from the candidate list (e.g., short list) 630-7. A STA can then associate with the selected AP 630-8.

Figure 7A:
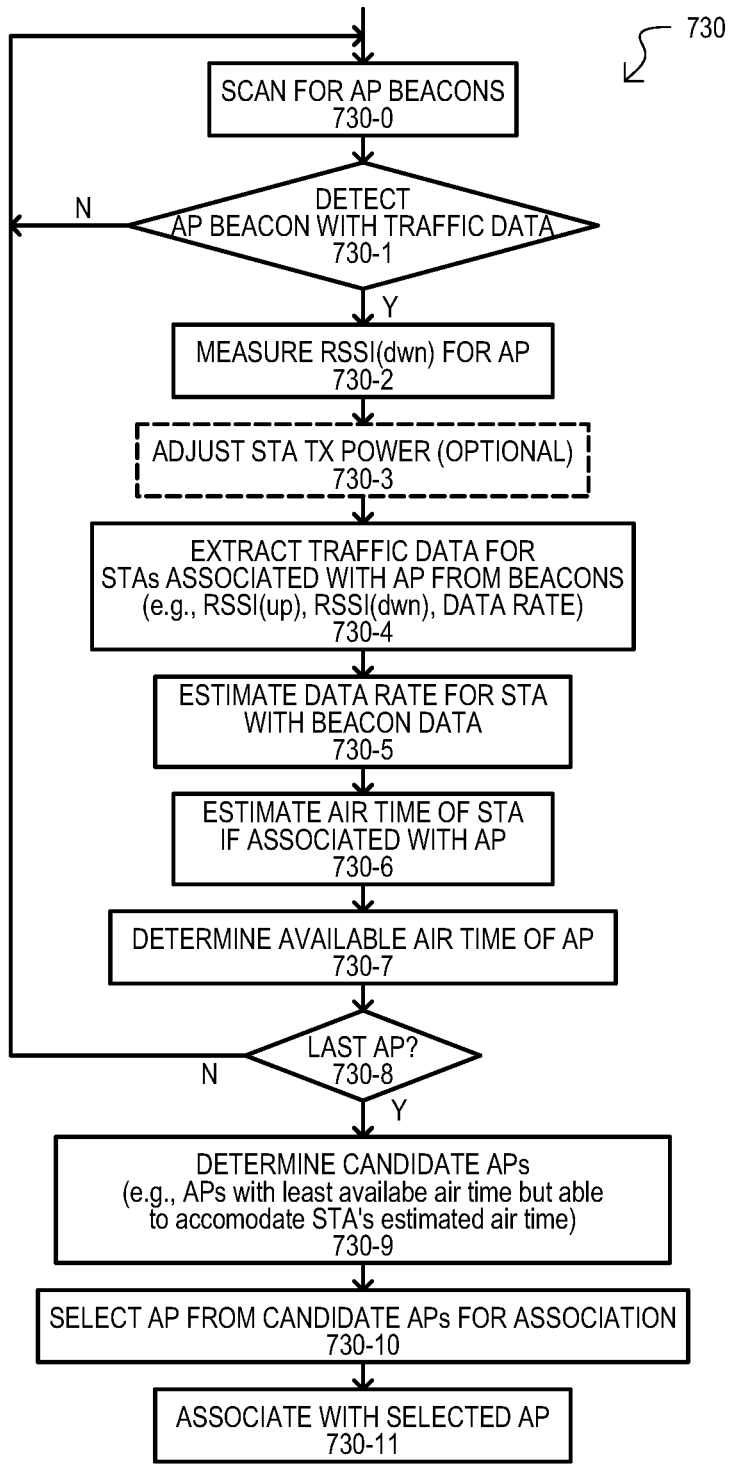
FIGS. 7A to 7D are flow diagrams of STA and AP methods of operation according to embodiments.

FIG. 7A is a flow diagram of a method 730 according to another embodiment. A method 730 can be executed by a STA that is newly arrived at an operating environment having multiple APs. A method 730 can include scanning for beacons 730-0. Such an action can include scanning for AP beacons broadcast according to one or more IEEE 802.11 wireless standards. If AP beacons with traffic data are not detected (N from 730-1), a method 730 can continue to scan for AP beacons.

If an AP beacon with traffic data is detected (Y from 730-1), a method 730 can detect the receive power for the AP beacon (e.g., RSSI(dwn)) 730-2. Optionally, a method can 730 can adjust a transmit data power for the STA 730-3. Such an action can include adjusting transmit power based on the operating environment, including the detected RSSI (dwn) for the AP.

A method 730 can include extracting traffic data for other STAs associated with the AP from the beacon 730-4. Such an action can include extracting traffic information from a beacon, including but not limited to data for each associated station, including any of: RSSI(dwn), RSSI(up), data rate, or modulation/coding scheme. After extracting data for STAs associated with the AP, an estimated data rate for the STA can be determined 730-5. Such an action can include examining traffic data for the associated STAs, and determining a closest matching associated STA based on power levels and/or type of modulation or coding. Such an action can include extrapolating, or using similar estimation algorithms, in the event there is no sufficiently matching associated STA. With an estimated data rate, a method 730 can estimate a resulting air time, were the STA to associate with the AP 730-6. Such an action can include using an estimated data rate with an expected throughput to arrive at an air time. An expected throughput can be the amount of data expected to be transmitted in a predetermined period of time, and can be based on the type of STA device and/or function the STA performs, or can take into account historical data regarding up/down throughput for the STA. If beacon data has not been gathered for all suitable APs in the operating environment (N from 730-8), a method continue scanning (return to 730-0).

If beacon data for all suitable APs has been acquired (Y from 730-8), a method can determine candidate APs for association 730-9. In some embodiments, candidate APs can be APs having the least available air time, but still capable of accommodating the STAs estimated air time. An AP can be selected from the candidate APs 730-10. Such an action can include a random selection. However, other embodiments can include additional factors, such as how many STAs are already associated with the AP. A STA can then associate with the selected AP 730-11.

Figure 7B:
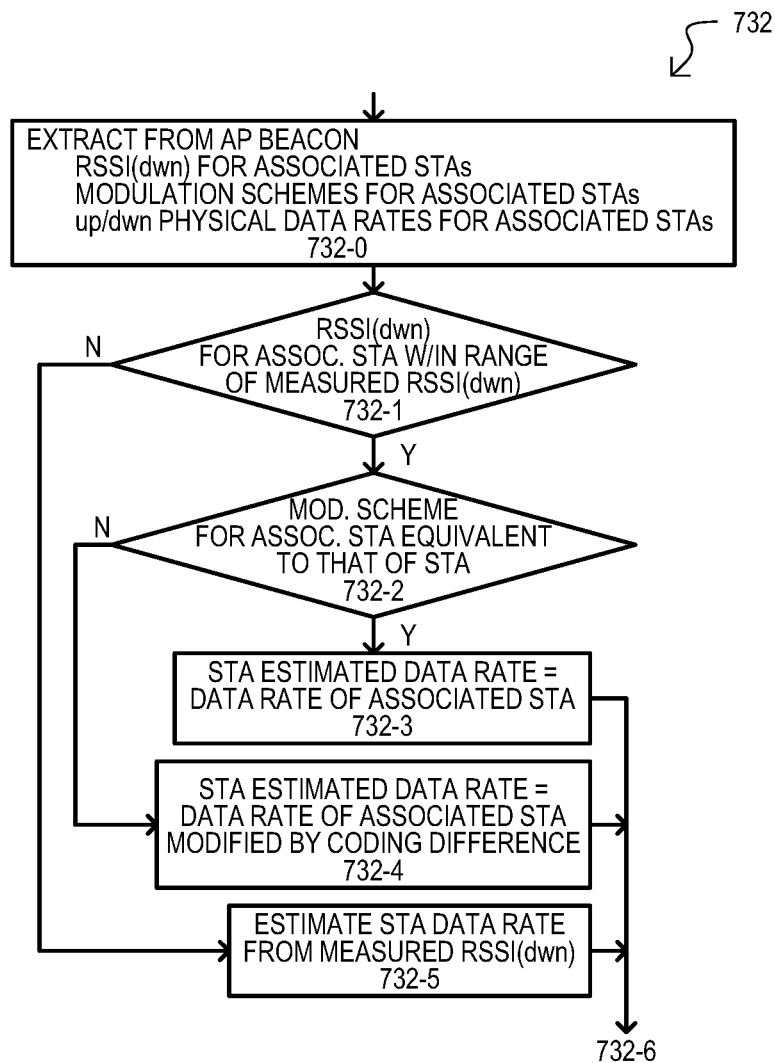

FIG. 7B is a flow diagram of another method 732 according to an embodiment. A method 732 can be executed by a joining STA to determine its estimated data rate were it to join an AP using beacon data from the AP. A method 732 can include extracting data from an AP beacon 732-0. Such an action can include extracting data as described for any of the embodiments herein, including but not limited to RSSI(dwn) data for each associated STA, modulation/coding schemes for each associated STA, and possibly actual or estimated data rates for each associated STA.

A method 732 can compare receive power levels of STAs associated with the AP to receive power levels of the joining STA 732-1. Such an action can include finding a STA with a closest matching power level from all STAs associated with an AP. If a receive power for an associated STA is sufficiently close (Y from 732-1), a modulation scheme for the associated can be compared to that of the joining STA 732-2. If a modulating scheme of the associated STA is the same or equivalent to that or the joining STA (Y from 732-2), the joining STA can use the data rate of the associated STA as its estimated data rate. If a modulating scheme of the associated STA is not the same or equivalent (N from 732-2), the joining STA can generate an estimated data rate the data rate of the other STA adjusted according to the modulation/coding difference 732-4.

If there is no associated STA with a suitable connection profile (N from 732-1 or N from 732-2), a method 732 can estimate a data rate from its measured RSSI(dwn) value 732-5. In some embodiments, this can include using a table or formula that generates an estimated data rate from an RSSI(dwn) value and modulation/coding scheme (which can be derived from the beacon). A method 732 can then proceed to determining whether or not to associate with an AP 732-6 as described for various embodiments herein, or equivalents.

Figure 7C:
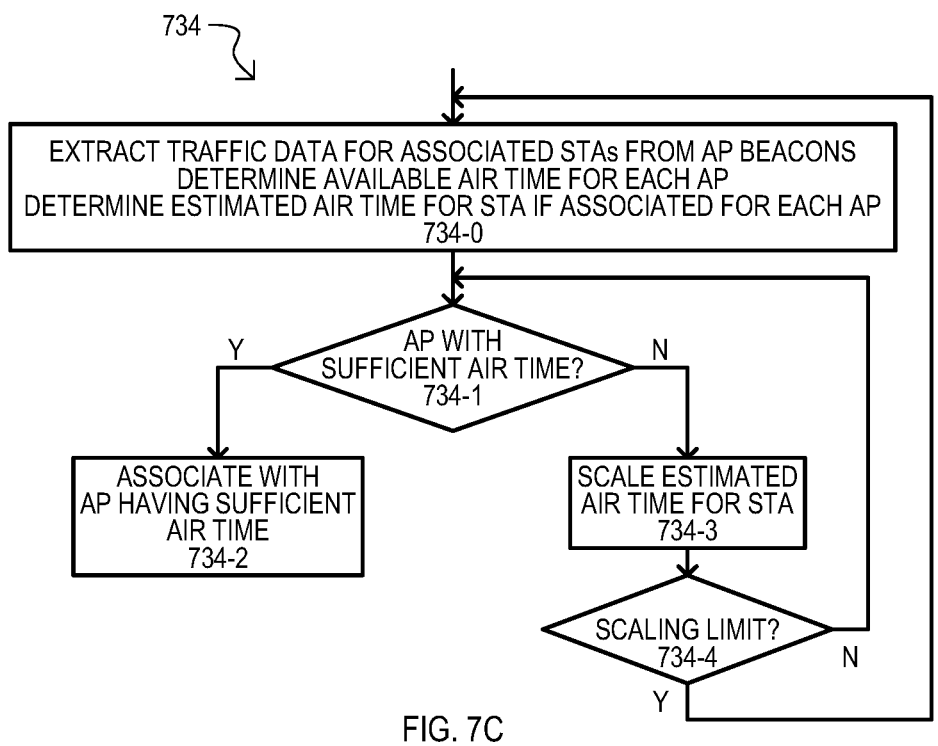

FIG. 7C is a flow diagram of a method 734 for scaling data rate estimations according to an embodiment. A method 734 can be executed by a newly arrived STA in a dense deployment environment that determines no AP has sufficient air time for its estimated throughput needs. A method 734 can include extracting traffic data from AP beacons, determining an available air time for all APs, and determining an estimated air time for the newly arrived STA were it to associate with each AP 734-0. Such actions can include those described herein or equivalents.

A method 734 can determine if there is one or more APs with sufficient available air time to meet the throughput needs of the newly arrived STA 734-1. If such an AP exists (Y from 734-1), a method 732 can include selecting the AP for association according to the various approaches described herein, or equivalents.

If there is not an AP with sufficient available air time (N from 734-1), a method 734 can scale its estimated air time down (e.g., by a factor less than one) 734-3. Providing such scaling has not reached a limit (N from 734-4), a method 732 can return to determining if the scaled down air time can be met by an AP (return to 734-1). If a scaling limit has been reached (Y from 734-4), a method 734 can return to scanning for APs. A scaling limit can be a predetermined limit on data throughput or performance for the newly arrived STA or an application executed by the newly arrived STA.

Figure 7D:
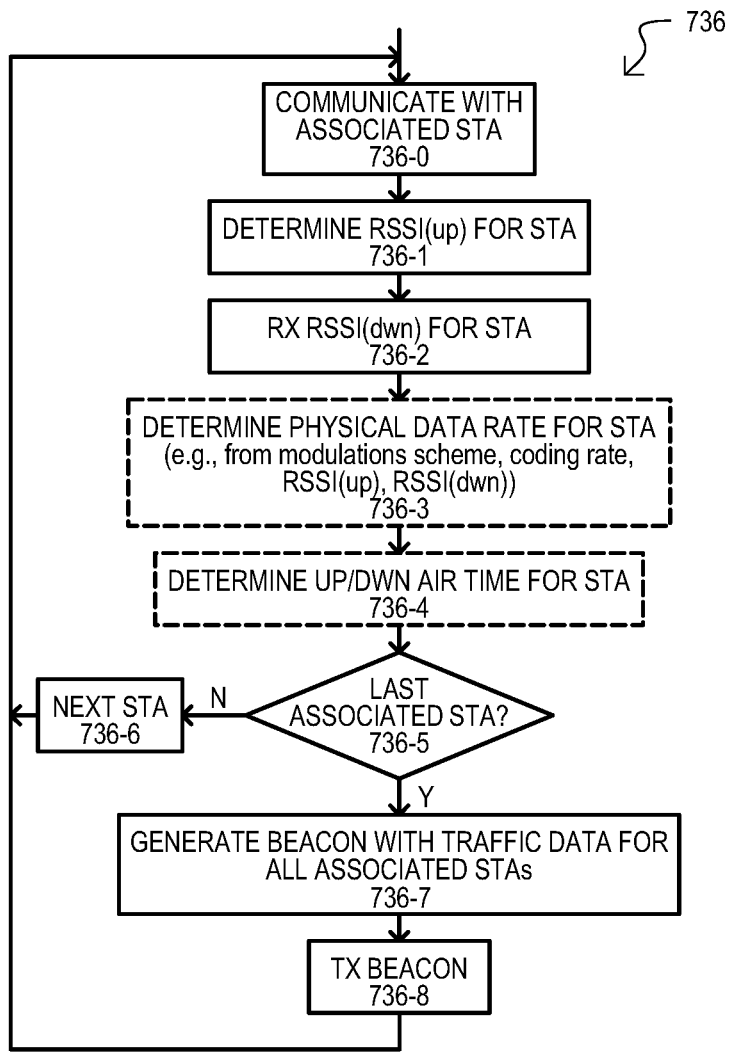

FIG. 7D is a flow diagram of a method 736 according to another embodiment. A method 736 can be executed by an AP to generate a broadcast transmission for STAs seeking association. A method 736 can be compatible with communications according to one or more IEEE 802.11 wireless standards.

A method 736 can include communicating with associated STAs 736-0. Such an action can include an AP communication with a STA through a collision based protocol (e.g., RTS-CTS) and/or an AP-STA communications occurring in a predetermined time period (e.g., target wake time). An AP can initiate such communications or a STA can initiate such communications. Such communications can be a single communication (transmission of downlink data or reception of uplink data), or can be cumulative (multiple such communications). From such communications with a STA, a method 736 can determine an RSSI(up) value for the STA 736-1, and can receive RSSI(dwn) values from the STA 736-2.

Optionally, a method 736 can determine a physical data rate for the STA 736-3. Such an action can include estimating a physical data rate for the STA based on a data for the link with the STA (e.g., modulation/coding scheme, RSSI (up), RSSI(dwn)). In some embodiments, a STA may transmit its own data rate value, which can be an actual downlink data rate, or can be an estimated data rate. As understood from embodiments herein, in other embodiments a newly arrived STA may perform this function based on beacon data provided by an AP.

Optionally, a method 736 can determine an air time for each STA 736-4. Such an action can include recording and/or determining up/dwn transmission time for the STA in a given time period, including a running time period (e.g., running average). As in the case of 736-3, in other embodiments a newly arrived STA may perform this function based on beacon data provided by an AP.

While all associated STAs have not been evaluated (N from 736-5), a method 736 can advance to a next associated STA 736-6 and determine traffic information for the STA (return to 736-0). When traffic data has been acquired for all associated STAs (Y from 736-5), a method 736 can generate a beacon containing such data 736-7. It is understood that such beacon data can take the form of any of those described herein or equivalents, and includes data sufficient for a newly arrived STA to estimate its own data rate/air time were it to associated with the AP as well as the available air time of the AP. The beacon can then be transmitted 736-8.

Figure 8A:
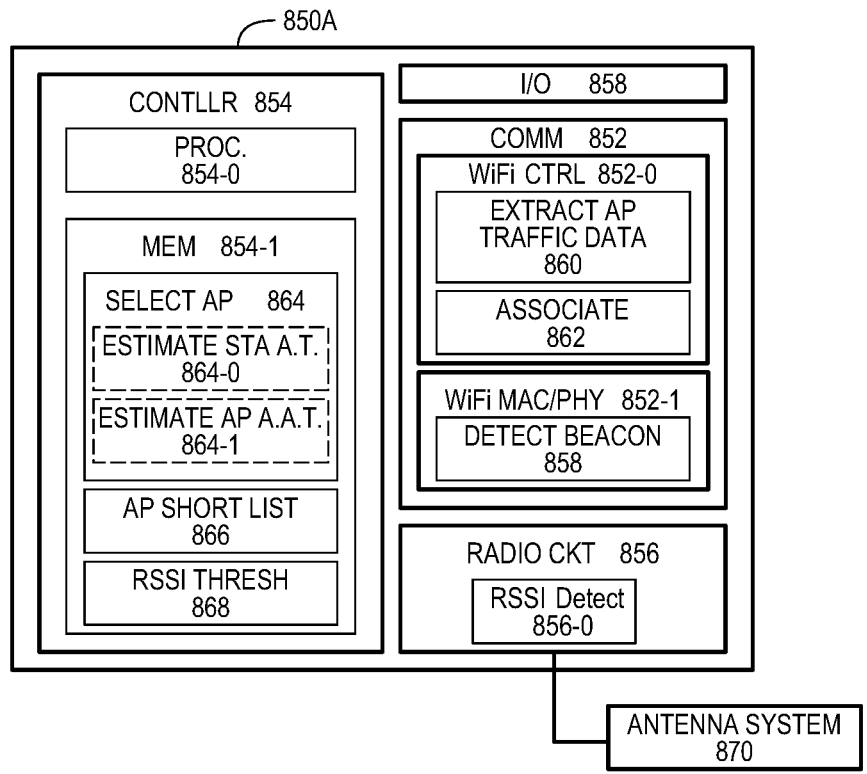
FIGS. 8A and 8B are block diagrams of devices according to embodiments.

FIG. 8A is a block diagram of a device 850A according to embodiment. A device 850A can part of a STA as described herein or equivalents. A device 850A can include communication circuits 852, controller 854, radio circuits 856, and input/output (I/O) circuits 858. Communication circuits 852 can include WiFi control circuits 852-0 and WiFi MAC/PHY circuits 852-1. WiFi control circuits 852-0 can execute communication operations compatible with one or more IEEE 802.11 wireless standards. This can include extracting AP traffic data from received packets 860, as well as conventional association functions for associating with an AP 862. WiFi MAC/PHY circuits 852-1 can control data transmission and reception according to one or more IEEE 802.11 wireless standards. Accordingly, WiFi MAC/PHY circuits 852-1 can detect and receive beacon packets 858, including beacon packets having AP traffic information.

A controller 854 can control transmissions by communication circuits 852. In some embodiments, a controller 854 can include circuits (or instructions executable by circuits) for controlling wireless transmissions according to other processes (e.g., applications). In the embodiment shown, a controller 854 can include a processor section 854-0 and a memory section 854-1. In the embodiment shown, a memory section 854-1 can store instructions for executing processes, including an AP selection process 864. An AP selection process 864 can select an AP for association according to any of the embodiments disclosed herein, or an equivalent. In some embodiments, AP selection process 864 can include a STA air time estimation section 864-0 and AP available air time estimation section 864-1. A STA air time estimation section 864-0 can estimate the air time for its throughput needs with respect to each detected AP, based on a traffic information from the AP. Such actions can include any of those described herein, or equivalents. In some embodiments, STA air time estimation section 864-0 can us an RSSI(dwn) value detected by radio circuit 846. AP available air time estimation section 864-1 can estimate or determine the available air time of an AP from received beacon data.

In some embodiments, a memory section 854-1 can store various values for an AP selection process 864. In the embodiment shown, memory section 854-1 can store a short list of candidate APs 866. Such a short list can take the form of any of those described herein, or an equivalent, including a list of APs having the least available air time, yet still able to serve the throughput requirements of the device 850A. A memory section 854-1 can also store one or more RSSI threshold values 868. RSSI threshold values 868 can be used to discard APs from consideration as association candidates (i.e., if an RSSI for an AP is below the RSSI threshold, the AP is not considered for association).

Radio circuits 856 can include circuits for receiving and transmitting signals according to one or more IEEE 802.11 wireless standards. Radio circuits 856 can include any suitable circuits according to a selected protocol, and in some embodiments can include baseband circuits. In the embodiment shown, radio circuits 856 can include RSSI detect circuits 856-0 which can generate an RSSI value for received packets/data frames, including beacon frames. In some embodiments, radio circuits 856 can transmit/receive on any internationally recognized industrial, scientific, or medical (ISM) band, as well as portions of such bands. In some embodiments, radio circuits 856 can operate in any or all of 2.4 GHZ, 5 GHz or 6 GHz bands.

I/O circuits 858 can enable control of device 850A by another system or device. I/O circuits 858 can include circuits that enable communication with the device according to any suitable method, including any of various serial data communication standards/methods including but not limited to: serial digital interface (SDI), universal serial bus (USB), universal asynchronous receiver transmitter (UART), I²C, or I²S.

When included as part of a system, device 850A can include one or more antenna systems 870 connected to radio circuits 856. Antenna system 870 can include antennas for receiving and transmitting over one or more channels. In some embodiments, antenna system 870 can be configured for data transmission and reception compatible with one or more IEEE 802.11 wireless standards.

Figure 8B:
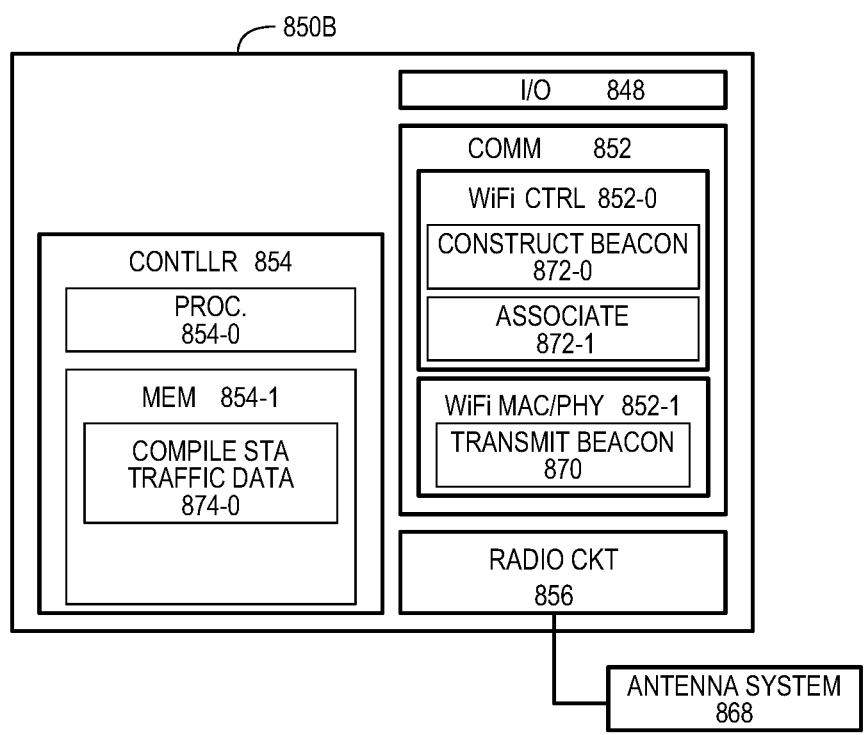

FIG. 8B is a block diagram of a device 850B according to embodiment. A device 850B can part of an AP as described herein or equivalents. A device 850B can include circuits like those of FIG. 8A, and such circuits can operate in the same or an equivalent fashion. As in the case of FIG. 8A, a device 850B can execute communication operations compatible with one or more IEEE 802.11 wireless standards. However, such operations can be in the role of an AP, and so can include constructing beacons 872-0, including beacons with traffic information as described herein or equivalents, as well as association functions 872-1 for associating with a STA. WiFi MAC/PHY circuits 852-1 can transmit beacon packets 870, including beacon packets having traffic information.

In the embodiment shown, local devices (1050A-0 to -3) can be Internet-of-things (IoT) type devices, such as lighting devices 1050A-0, locking devices 1050A-1, entertainment devices 1050A-2, security devices 1050A-3, instrumentation devices 20) 1050A-4, as but a few of many possible examples. As each local device (1050A-0 to -3) is added to the operating environment, it can monitor for broadcasts from gateways devices (1050B-0 to -2) that include throughput information, and then select one for association as described herein and equivalents.

Figure 9:
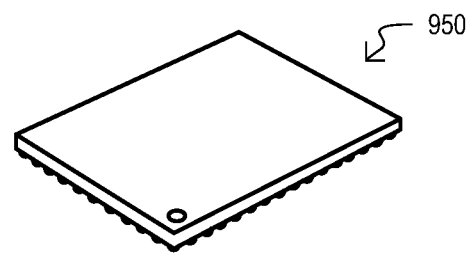
FIG. 9 is a diagram of an integrated circuit device according to an embodiment.

While embodiments can include systems and devices with various interconnected components, embodiments can also include unitary devices which can enable devices to execute association processes that can lead to efficient, balanced access to APs in dense operating environments, as describe herein or equivalents. In some embodiments, such unitary devices can be advantageously compact single integrated circuits (i.e., chips). FIG. 9 show one particular example of a packaged single chip wireless device 950. Such a device 950 can include circuits for providing the STA and/or AP functions described herein and equivalents. In some embodiments, a device 950 can include circuits like those shown in FIGS. 8A and/or 8B.

However, it is understood that a device according to embodiments can include any other suitable integrated circuit packaging type, as well as direct bonding of a device chip onto a circuit board or substrate.

Figure 10:
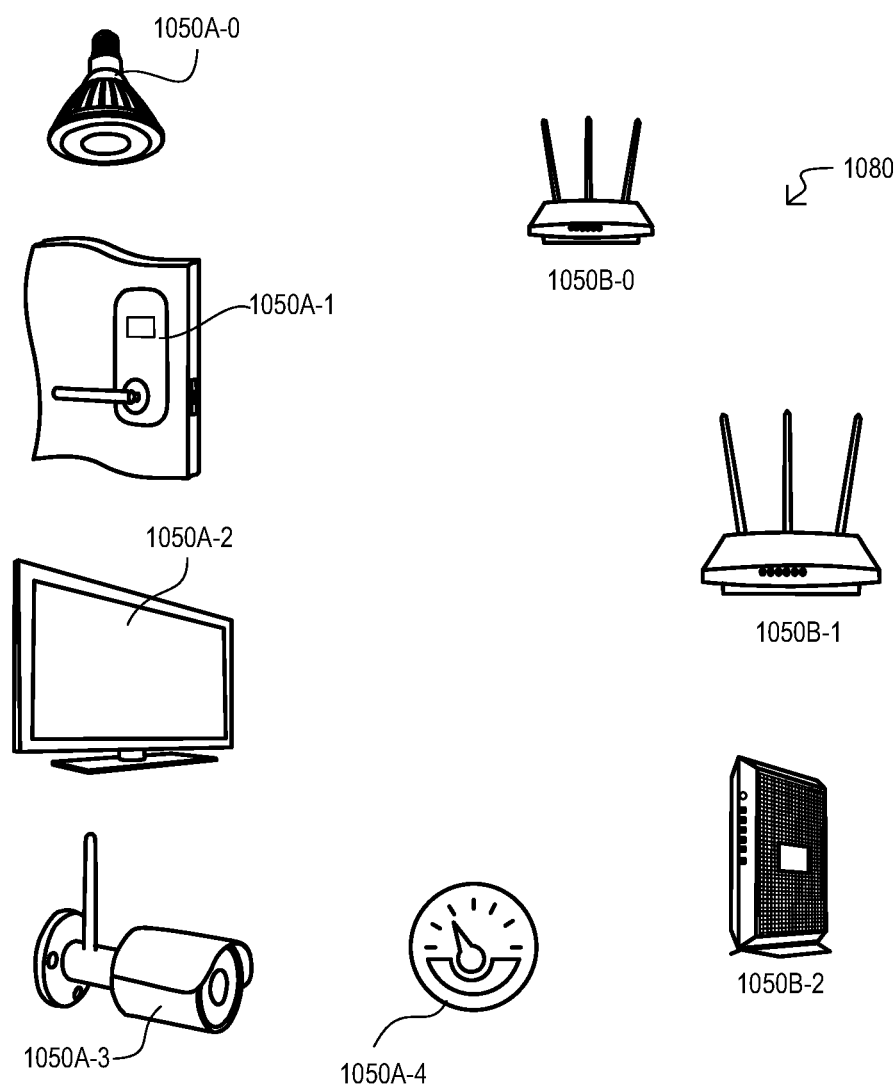
FIG. 10 is a diagram of a system according to an embodiment.

FIG. 10 shows a system 1080 according to an embodiment. A system 1080 can include various local devices 1050A-0 to -4 and gateway devices 1050B-0 to -2. Local devices (1050A-0 to -4) can be STAs as described herein or equivalents, and gateway devices (1050B-0 to -2) can be APs as described herein or equivalents. Gateway devices 1050B-0 to -2 can have overlapping operating regions. Thus, as local devices (1050-0 to -4) are added to an operating environment, such devices (1050-0 to -4) can associate with one of the gateway devices (1050B-0 to -2).

In the embodiment shown, local devices (1050A-0 to -3) can be Internet-of-things (IoT) type devices, such as lighting devices 1050-0, locking devices 1050-1, entertainment devices 1050-2, security devices 1050-3, instrumentation devices 1050-4, as but a few of many possible examples. As each local device (1050A-0 to -3) is added to the operating environment, it can monitor for broadcasts from gateways devices (1050B-0 to -2) that include throughput information, and then select one for association as described herein and equivalents.

Embodiments can include a STA associating with one of multiple APs in a dense operating environment based on throughput information broadcast by all such APs, and thus shape or organize traffic in a predetermined way.

Embodiments can include a STA selecting from among APs having a lowest available capacity for association, thus enabling one or more other APs to remain with relatively high throughput for higher traffic devices that may join in the future.

Embodiments can include a STA selecting from among APs operating with air time fairness. In such an arrangement, STAs can tend to be evenly distributed among a set of APs.

Embodiments can limit adverse effects of high-rate STAs joining a dense operating environment, as compared to conventional contention based access methods.

These and other advantages would be evident to those skilled in the art.

While embodiments have included a broadcast transmission from an AP that includes throughput value for that AP, alternate embodiments can include broadcast transmissions that include throughput data for more than one AP.

While throughput data can include air time amounts, throughput data can also include other data, such as transmit power at the AP and/or receive power at the AP for other devices (e.g., STAs).

While embodiments have described wireless environments compatible with IEEE 802.11 wireless standards, alternate embodiments can include operations according to other standards. In such alternate embodiments, an AP can be a device that controls access to a network, as well as transmission with its network. STAs are devices that may be added to the network with permission from the AP (e.g., association).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method, comprising:
    by operation of a station wireless device (STA):
        receiving a plurality of different broadcast transmissions from different access point devices (APs),
        determining an air time availability of each of the APs from data included within the broadcast transmissions,
        for each of the plurality of APs, estimating a data rate for the STA with respect to the AP from traffic data included in at least one broadcast transmission from the AP, the traffic data including traffic information for each other STA associated with the AP,
        in response to estimating the data rate for the STA with respect to the AP, selecting one AP from the plurality of APs based on predetermined traffic metrics for the plurality of APs, and
        associating with the selected AP.

2. The method of claim 1, wherein:
    estimating the data rate for the STA for each of the plurality of APs includes extracting at least one predetermined information element from a beacon transmission from each AP.

3. The method of claim 2, wherein:
    the at least one predetermined information element comprises a receive power value for each other STA associated with the AP, the receive power value being a measure of signal power from the AP at the associated STA.

4. The method of claim 2, wherein:
    the at least one predetermined information comprises a modulation or coding scheme for the link between the AP and the associated STA.

5. The method of claim 1, wherein:
    selecting one AP based on predetermined traffic metrics for the plurality of APs includes
        determining a subset of APs from the plurality of APs, the subset of APs having a lowest available air time from the plurality of APs, and
        randomly selecting one AP from the subset of APs.

6. The method of claim 1, wherein:
    selecting one AP based on predetermined traffic metrics for the plurality of APs includes
        determining a received signal strength for a broadcast transmission corresponding to each AP, and
        estimating the data rate for the STA with respect to each AP using at least the received signal strength for the AP.

7. The method of claim 1, further including:
    by operation of the STA, determining a receive power for each broadcast transmission, and
when a receive power of a broadcast transmission is below a predetermined threshold, excluding the AP from selection for association.

8. A device, comprising:
radio circuits configured to transmit and receive wireless communications; and
communication circuits configured to
extract traffic values for a plurality of access point devices (APs) from received broadcast transmissions, including traffic data for each other station device (STA) associated with an AP,
estimate an available air time for each AP,
estimate a data rate for the device with respect to each AP based on a traffic data for other STAs associated with the AP,
estimate a revised throughput for each AP based on at least the estimated data rate for the device and the traffic data for each other STA associated with the AP,
select at least one AP from the plurality of APs based on the revised throughput for the at least AP, and
associate with the at least one AP having the lowest revised throughput.

9. The device of claim 8, wherein:
the radio circuits are further configured to determine a receive power value for the received broadcast transmissions; and
the communication circuits are further configured to estimate the data rate for the device with respect to each AP with at least the receive power for a broadcast transmission from the AP.

10. The device of claim 8, wherein:
the radio circuits are further configured to determine a receive power value for the broadcast transmissions; and
the communication circuits are further configured to exclude an AP from selection for association when a receive power for a broadcast transmission from the AP is below a predetermined threshold.

11. The device of claim 8, wherein:
the communication circuits include media access control circuits configured to extract information elements from beacon transmissions, the information elements including the traffic data for each other STA associated with an AP.

12. The device of claim 11, wherein:
the traffic data for each other STA associated with an AP is selected from the group of: a receive power for the other STA with respect to signals from the AP, a modulation or coding scheme for communications between the other STA and the AP, an available air time for the AP.

13. The device of claim 8, wherein:
the communication circuits are configured to
determine a subset of APs having a lowest available air time from the plurality of APs, and
randomly select one AP from the subset of APs.

14. The device of claim 8, wherein:
the radio circuits and communication circuits are formed with a same integrated circuit substrate.

15. A system, comprising:
a station wireless device (STA) configured to
determine an AP available air time for each of a plurality of access point devices (APs) from broadcast transmissions of the APs,
determine an estimated STA air time each of the plurality of APs, each estimated STA air time being air time at each AP needed to meet a predetermined data throughput for the STA and any other STAs associated with the AP,
determine a revised available air time for each of the plurality of APs based on the estimated STA air time and data throughput for any other STAs associated with the AP,
select at least one AP based on at least the revised available air time for the APs, and
associating with the at least one AP from among the APs having a lowest revised available air time; and
an antenna system coupled to the STA and configured to receive and transmit wireless signals, including receiving the broadcast transmissions.

16. The system of claim 15, further including:
a plurality of APs, each AP configured to
generate traffic data for each STA associated with the AP, and
transmit a corresponding broadcast transmission that includes the traffic data for each STA associated with the AP.

17. The system of claim 16, wherein:
the traffic data includes any selected from the group of: a receive power value corresponding to AP signal strength at the STA and a modulation/coding scheme for communications between the AP and the STA.

18. The system of claim 16, wherein:
at least one of the APs includes
memory circuits configured to store traffic data for each STA associated with the AP, and
processing circuits configured to generate a beacon frame containing the traffic data for all associated STAs.

19. The system of claim 16, wherein:
at least one of the APs is configured to provide equal throughput for all STAs associated with the at least one AP.

20. The system of claim 15, wherein:
the STA is configured to
determine a subset of APs having the lowest available air time from the plurality of APs, and
randomly select one AP from the subset of APs.

* * * * *